United States Patent [19]

Farley et al.

[11] Patent Number: 4,796,025
[45] Date of Patent: Jan. 3, 1989

[54] MONITOR/CONTROL COMMUNICATION NET WITH INTELLIGENT PERIPHERALS

[75] Inventors: Robert W. Farley, Gardner; Lawrence Kaplan, Greenfield; Daniel J. Rodrigues, Lunenburg; Bruce A. Wahler, Eitchburg; Charles J. Motyka, Gardner, all of Mass.

[73] Assignee: Simplex Time Recorder Co., Gardner, Mass.

[21] Appl. No.: 741,096

[22] Filed: Jun. 4, 1985

[51] Int. Cl.[4] .......................... H04Q 9/00; G05B 23/02
[52] U.S. Cl. ................................ 340/825.080; 370/94; 340/825.36; 340/533
[58] Field of Search ............... 340/825.36, 825.06, 340/825.44, 825.5, 825.53, 825.08, 825.07; 370/60, 83, 41, 94, 85

[56] References Cited

U.S. PATENT DOCUMENTS

| | | | |
|---|---|---|---|
| 2,842,753 | 7/1958 | Ewen | 340/171 |
| 3,176,225 | 3/1965 | Ransom et al. | 325/38 |
| 3,234,533 | 2/1966 | Poli | 340/213 |
| 3,293,605 | 12/1966 | Moore | 340/150 |
| 3,325,598 | 6/1967 | O'Neill, Jr. | 179/2 |
| 3,357,007 | 12/1967 | Wike | 340/183 |
| 3,357,009 | 12/1967 | Rusnak et al. | 340/216 |
| 3,366,882 | 1/1968 | Briley et al. | 325/38 |
| 3,420,947 | 1/1969 | Kerwin | 178/3 |
| 3,517,130 | 6/1970 | Rynders | 179/15 |
| 3,550,114 | 12/1970 | Cole | 340/347 |
| 3,601,543 | 9/1971 | Maniere | 179/15 |
| 3,618,081 | 11/1971 | Morrow | 340/409 |
| 3,622,885 | 11/1971 | Kruszynski et al. | 325/40 |
| 3,633,169 | 1/1972 | Bickford | 340/172.5 |
| 3,686,635 | 8/1972 | Millington et al. | |
| 3,713,142 | 1/1973 | Getchell . | |
| 3,716,834 | 2/1973 | Adams | 340/147 R |
| 3,742,452 | 6/1973 | Audretsch, Jr. | 340/147 R |
| 3,765,016 | 10/1973 | Bert et al. | 340/408 |
| 3,793,488 | 2/1974 | King | 179/15 BS |
| 3,806,872 | 4/1974 | Odam | 340/409 |
| 3,806,872 | 4/1974 | Odom | 340/147 R |
| 3,828,313 | 8/1974 | Schull et al. | 340/147 SY |
| 3,851,104 | 11/1974 | Willard et al. | 179/15 BY |
| 3,854,122 | 12/1974 | Cross | 340/151 |
| 3,876,997 | 4/1975 | Farley | 340/183 |
| 3,878,512 | 4/1975 | Kobayashi et al. | 340/168 R |
| 3,886,534 | 5/1975 | Rosen | 340/216 |
| 3,921,139 | 11/1975 | Hardesty, Jr. et al. | 340/152 R |
| 3,946,380 | 3/1976 | Ohnishi et al. | 340/409 |
| 4,037,199 | 7/1977 | Rozehnal et al. | 340/150 |
| 4,048,620 | 9/1977 | Crandall et al. | 340/825.53 |
| 4,053,714 | 10/1977 | Long | 179/15 AL |
| 4,067,008 | 1/1978 | Sprowls III | 340/409 |
| 4,072,923 | 2/1978 | Siems et al. | 340/15.5 TS |
| 4,086,570 | 4/1978 | Wakasa et al. | 340/172 |
| 4,090,193 | 5/1978 | Hinkle, Jr. | 340/412 |
| 4,093,946 | 6/1978 | Fowler | 340/310 |
| 4,103,337 | 7/1978 | Whiteside | 364/900 |
| 4,115,856 | 9/1978 | Francois Labeye et al. | 364/200 |

(List continued on next page.)

FOREIGN PATENT DOCUMENTS 900816 4/1985 Belgium .

*Primary Examiner*—Donald J. Yusko
*Attorney, Agent, or Firm*—Panitch Schwarze Jacobs & Nadel

[57] ABSTRACT

A monitor/control communication net with intelligent peripherals, that is, peripherals which are capable of monitoring and/or controlling various devices in accordance with messages received from a central panel cpu and which are also capable of reporting to the central panel the status of one or more devices monitored by the peripheral. Each peripheral is assigned a unique address by which it is polled by the central panel. All communication messages between the central panel and peripherals include a format code which indicates the nature of the message and the length of any data field in the message. Communication time is minimized by permitting the data field to vary in length from one peripheral to another, depending on the number and type of devices being monitored and/or controlled by the peripherals.

27 Claims, 11 Drawing Sheets

U.S. PATENT DOCUMENTS

| | | | |
|---|---|---|---|
| 4,139,737 | 2/1979 | Shimada et al. | 179/15 AL |
| 4,149,144 | 4/1979 | Diefenderfer | 340/147 R |
| 4,160,238 | 7/1979 | Weckemann et al. | 340/147 R |
| 4,163,218 | 7/1979 | Wu | 340/310 A |
| 4,203,096 | 6/1980 | Farley et al. | 340/538 |
| 4,205,200 | 5/1980 | Parikh et al. | 370/83 |
| 4,206,449 | 6/1980 | Galvin et al. | 340/505 |
| 4,283,717 | 8/1981 | Caldwell et al. | 340/506 |
| 4,290,055 | 9/1981 | Furney et al. | 340/518 |
| 4,310,896 | 1/1982 | Cutler et al. | 364/900 |
| 4,320,388 | 3/1982 | McCarthy | 340/825.54 |
| 4,342,985 | 8/1982 | Desjardins | 340/525 |
| 4,342,986 | 8/1982 | Buskirk et al. | 340/539 |
| 4,356,475 | 10/1982 | Neumann et al. | 340/521 |
| 4,383,257 | 5/1983 | Giallanza et al. | 340/825.44 |
| 4,385,287 | 5/1983 | Eatwell | 340/537 |
| 4,390,969 | 6/1983 | Hayes | 364/900 |
| 4,392,125 | 7/1983 | Iwata | 340/518 |
| 4,400,694 | 8/1983 | Wong et al. | 340/505 |
| 4,410,883 | 10/1983 | Swiston, Sr. | 340/538 |
| 4,413,250 | 11/1983 | Porter et al. | 340/310 A |
| 4,423,410 | 10/1983 | Galvin et al. | 340/525 |
| 4,423,506 | 12/1983 | Kawasaki et al. | 370/85 |
| 4,429,299 | 1/1984 | Kabat et al. | 340/310 R |
| 4,439,763 | 3/1984 | Limb | 340/825.5 |
| 4,445,214 | 4/1984 | Reynolds et al. | 370/94 |
| 4,446,458 | 5/1984 | Cook | 340/825.06 |
| 4,451,881 | 5/1984 | Grice et al. | 364/200 |
| 4,463,352 | 7/1984 | Forbes et al. | 340/825.05 |
| 4,466,001 | 8/1984 | Moore et al. | 340/825.08 |
| 4,470,047 | 9/1984 | Vogt et al. | 340/825.36 |
| 4,477,800 | 10/1984 | O'Brien | 340/533 |
| 4,479,123 | 10/1984 | Loskorn et al. | 340/825.06 |
| 4,488,288 | 12/1984 | Turner | 370/60 |
| 4,489,312 | 12/1984 | Yoshizaki | 340/514 |
| 4,507,652 | 3/1985 | Vogt | 340/505 |
| 4,574,283 | 3/1986 | Ararawa et al. | 340/825.08 |
| 4,595,921 | 6/1986 | Wang et al. | 340/825.08 |
| 4,622,630 | 11/1986 | Vora et al. | 340/825.5 |
| 4,642,607 | 2/1987 | Strom et al. | 340/825.5 |
| 4,688,183 | 8/1987 | Carll | 340/825.07 |
| 4,692,945 | 9/1987 | Zdunek | 370/94 |

FIG. 4
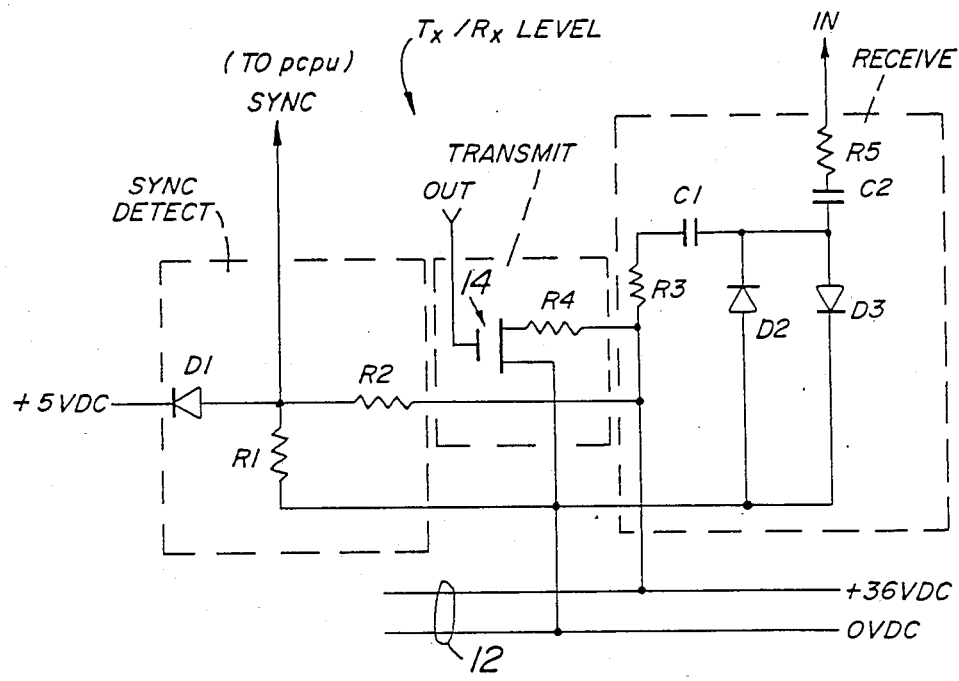
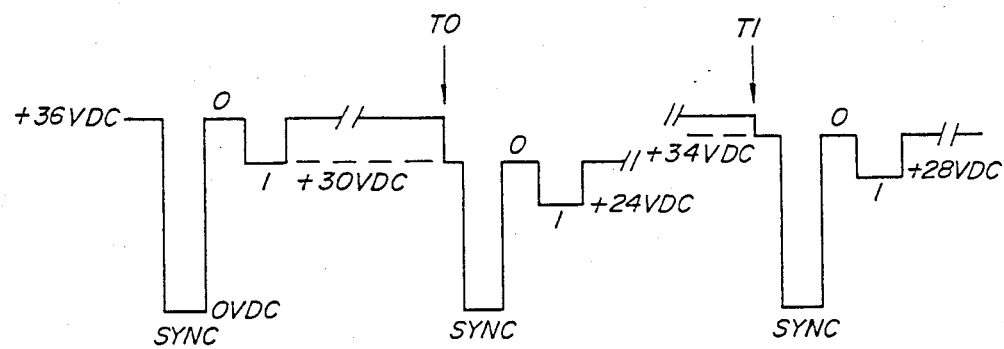
FIG. 11

4,796,025

MONITOR/CONTROL COMMUNICATION NET WITH INTELLIGENT PERIPHERALS

BACKGROUND OF THE INVENTION

The present invention is directed to a communication net for use in the fire alarm and security field and a specific communication protocol wherein various devices, particularly fire alarm and security devices, are monitored and/or controlled. All communication takes place by logic "1"s and "0"s. Pulse code modulation, frequency shift key transmission and the like is avoided. Devices are monitored and controlled by peripherals connected to a pair of communication lines emanating from a central panel cpu. Each peripheral is assigned a unique address by which the peripheral is polled by the central panel. Each peripheral may be polled so as to report back as to the status of one or more devices being monitored by the peripheral, or to control one or more output devices as instructed by the central panel.

BRIEF SUMMARY OF THE INVENTION

Communication net comprising a pair of communication lines, at least one peripheral device connected to said communication lines including means for receiving a digital poll message transmitted on said communication lines which message includes a first format code identifying the message as a poll and an address uniquely identifying the peripheral, means for validating said format code and address, means for monitoring the outputs of one or more devices connected to the peripheral, and means for transmitting a digital message on said communication lines which includes a second format code, an address identical to said address received by the peripheral, and a data field which indicates the status of said monitored outputs, and wherein said format code indicates the length of said data field.

BRIEF DESCRIPTION OF THE DRAWINGS

FIG. 4 is a schematic of the Tx/Rx level circuit which interfaces each peripheral with the communication lines.

FIG. 11 shows the effect of a peripheral fault on the communication lines.

DETAILED DESCRIPTION OF THE INVENTION

Figure 1:
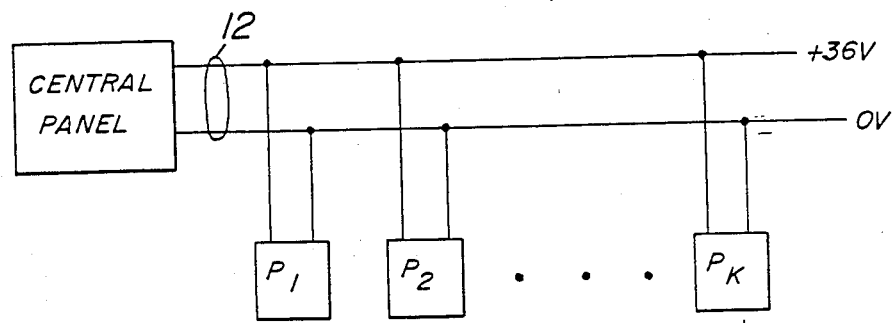
FIG. 1 is a block diagram of the communication net of the present invention showing intelligent peripherals P1–Pn.

Referring to the drawings, wherein like numerals indicate like elements, there is shown in FIG. 1 a block diagram of the communication net of the present invention, generally designated as 10. The net 10 includes a central panel, a pair of communication lines 12, and one or more intelligent peripherals P1–Pk electrically coupled to the lines.

Figure 2:
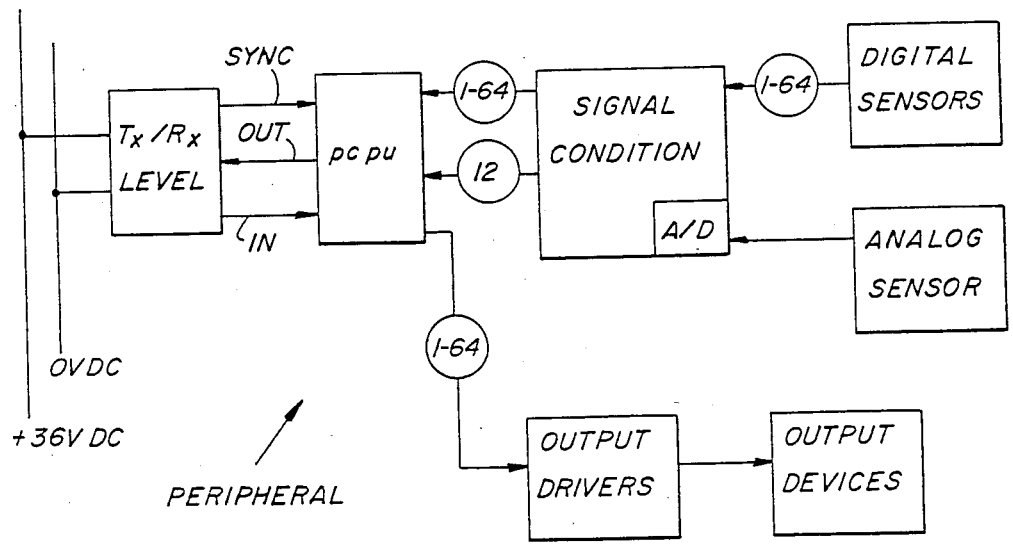
FIG. 2 is a block diagram of an intelligent peripheral according to the present invention.

A generalized block diagram of the intelligent peripheral is shown in FIG. 2. Each peripheral includes a Tx/Rx level circuit which is electrically coupled to the lines 12 and which interfaces the lines 12 and a peripheral central processing unit (pcpu). The Tx/Rx level circuit is shown in greater detail in FIG. 4. The Tx/Rx level circuit includes three circuits: a sync detect circuit, a transmit circuit, and a receive circuit. The sync detect circuit includes a pair of resistors R1, R2 which are connected as a voltage divider across the communication lines 12. A clipping diode D1 is coupled between the divider R1, R2 and a local +5 vdc source. The sync detect circuit detects a negative 36 volt sync pulse which is transmitted from the central panel (FIG. 2) at the start of each transmission message to a peripheral. The sync pulse pulls down the +36 vdc line to 0 vdc and is detected at the sync output of the Tx/Rx level circuit as a negative going 5 vdc pulse. The 5 vdc pulse is used to reset certain portions of the pcpu as described hereinafter.

The transmit circuit portion of the Tx/Rx level circuit comprises a FET 14 having a source coupled to the +36 vdc line by resistor R4. The +36 vdc line is actually a "floating" voltage line which represents logic "0". The FET drain is coupled to the 0 vdc line. A digital message is outputed by the pcpu and transmitted over the lines 12 by opening and closing the FET so as to produce negative going 6 vdc pulses on the +36 vdc line. Each negative transition represents a logic "1". Thus, digital communication from the pcpu to the central panel is realized by controlled 6 vdc swings such that the +36 vdc line varies between +36 vdc and +30 vdc. The presence of resistor R4 provides the communication net with a fault tolerance whereby the communication lines 12 remain open for communication between the central panel and other peripherals despite the possible failure of the Tx/Rx level circuit FET. The operation of resistor R4 is explained in greater detail hereafter in connection with FIG. 11.

The receive circuit portion of the Tx/Rx level circuit comprises a pair of oppositely poled diodes D2, D3 coupled between a pair of ac coupling capacitors C1, C2. Capacitor C1 is coupled to the +36 vdc line by resistor R3. Capacitor C2 is coupled to the In input line of the pcpu by resistor R5. A digital message is transmitted over the lines 12 from the central panel to a peripheral as shown in waveforms (a) and (b) of FIG. 3. As previously mentioned, each transmission from the central panel includes a negative going 36 vdc sync pulse, and negative going 6 vdc "logic" pulses. In a command message, the 6 vdc pulses define a 5 bit format code, 8 bit address and a parity bit. In a data message, the 6 vdc pulses define a variable length data field having an even number of bits (2–64 bits) and a 5 bit checksum as well. Each negative 6 vdc transition is detected by the receive circuit as a logic "1" and is processed by the pcpu as described hereafter. after.

The peripheral also includes a signal condition circuit (FIG. 2) having 64 "digital" (logic "1" or "0") output lines connected to the pcpu. The signal condition circuit may include a 12 bit analog to digital (a/d) conversion circuit which monitors at least one "analog" device having an analog signal output, such as a smoke detector, optical reader, or temperature sensor, designated "analog" sensor in FIG. 2. Each of the signal condition circuit output lines corresponds to an input line to the circuit or to one of the 12 outputs of the a/d circuit. If no analog sensor is being monitored, the a/d circuit may be omitted, and the signal condition circuit may monitor from 1 to 64 "digital" input lines from on/off devices, such as a fire alarm pull station or a set of contacts such as door contacts designated as "digital" sensors in FIG. 2. But if an analog sensor is being monitored, then the signal condition circuit can monitor up to 64 digital sensors as well as the analog sensor. The signal condition circuit performs the function of converting the digital sensor and analog sensor outputs to voltage levels compatible with the pcpu. Thus, the on/off states of the digital sensor output lines are transmitted to the pcpu, as is a 12 bit (parallel) converted analog sensor signal produced by the a/d portion of the signal condition circuit.

The peripheral also includes a set of output drivers, each of which controls an output device such as a relay for controlling a set of contacts for a device such as an exhaust fan, lamp, bell, alarm, horn or siren, or even an output device such as an alphanumeric CRT display. The output drivers electrically drive the output devices based on from 1 to 64 (parallel) digital outputs from the pcpu. The exact number of digital outputs from the pcpu is determined by the number and type of output devices being controlled by the peripheral. For example, the peripheral may control 64 on/off devices, such as relays, based on each of 64 digital output lines from the pcpu, or the pcpu may use only 30 digital output lines for controlling 30 on/off devices. By way of further example, the peripheral may control a single alphanumeric CRT display based on some other number of digital outputs from the pcpu between 1 and 64.

The communication net 10 provides a communication interface for as many as 256 separately addressable intelligent peripherals P1-Pk where the maximum value of k =256. By "intelligent" is meant that the peripheral has the ability to communicate digitally with the central panel which panel includes its own cpu and asynchronous receive/transmit (ART) circuitry. All communication takes place on the line pair 12 using serial, asynchronous, half-duplex communication at 3333 baud. The communication net employs a protocol which is based on a master/slave polling scheme.

Figure 3:
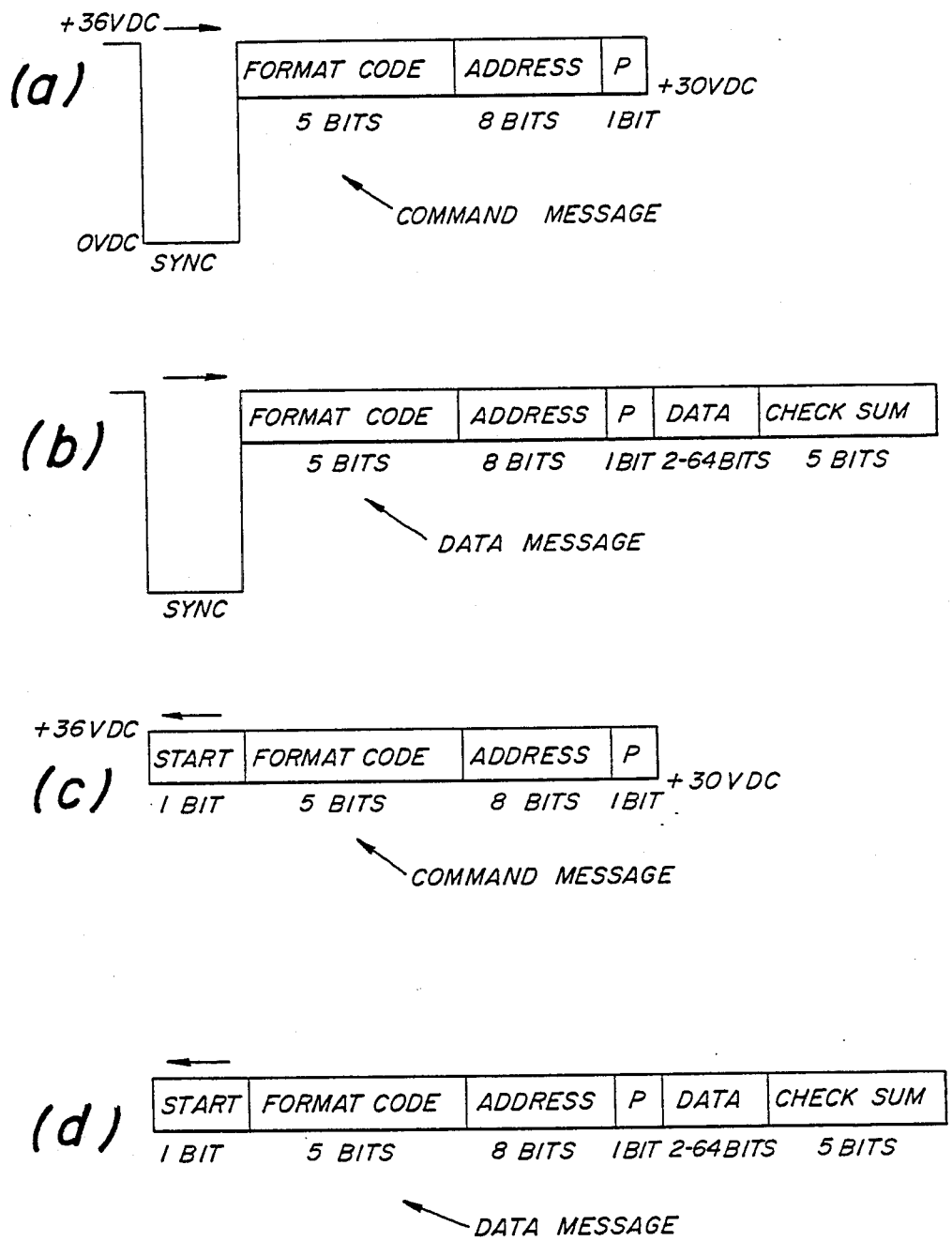
FIG. 3 is a chart showing the command and data messages which are transmitted between the central panel and the peripherals.

Referring to FIG. 3, there is shown a set of waveforms which characterize the digital communicatin protocol between the central panel and a peripheral. All digital communications in the net are initiated by the central panel. As described hereafter, a peripheral must receive an error free poll message from the central panel before it can communicate with the central panel.

The peripherals respond to two basic types of poll messages from the central cpu: command and data. See waveforms (a) and (b) in FIG. 3. Command messages are relatively short messages and include a general poll, broadcast poll, forced poll, device enquire poll, group poll and an acknowledge poll. The command message has no data field. Command messages are transmitted by the central panel to obtain a report from the peripheral as to the status of the monitored devices (digital and/or analog sensors). Data messages are used to transfer data between the central panel and the peripherals. TThe peripheral controls the output devices according to the data in the data field received from the central panel. The data field will vary in length (number of bits) depending on the number of output lines being controlled by the peripheral. For example, as previously indicated, the peripheral may control as many as 64 output lines. A data message to the peripheral may therefore be as long as 64 bits.

A peripheral responds to a central cpu poll message by transmitting a command message or a data message back to the central panel over line pair 12. A command message from the peripheral contains no data field. See waveform (c) in FIG. 3. The format code for a command message generated by a peripheral generally indicates that no change has occurred in the status of any digital sensor being monitored by the peripheral, so that there is no data to report. A data message from the peripheral contains a data field which varies in length between 2-64 bits depending on the number and type of sensors being monitored by the peripheral. See waveform (d) in FIG. 3. Data messages are transmitted by the peripheral only if there is a change in status of a monitored device to report. Otherwise, with the exception of a forced poll and group poll described hereafter, the peripheral transmits a command message indicating that there has been no change in status of the monitored devices. In the case of a forced poll, the peripheral will transmit a data message, indicating status of the monitored devices, whether or not the status of the monitored devices has chaneed. In the case of a group poll, the peripheral will not answer at all if there is no change in status of the monitored devices.

The nature of a command message transmitted between the central panel and a peripheral is designated by a 5 bit format code as described hereafter. The format code in a data message, whether transmitted by the central panel or the peripheral, also indicates the length of the data field (2-64 bits) in the message. Preferably, the data field in any data message consists of an even number of bits between 2 and 64 bits so that the 5 bit format code can indicate all possible lengths of the data field. However, it should be appreciated that the precise number of bits in the format code and data field is not otherwise limiting.

The format code immediately follows the sync pulse in any message generated by the central panel. See waveforms (a) and (b) in FIG. 3. The format code in any message generated by a peripheral immediately follows a start bit. See waveforms (c) and (d) in FIG. 3. Note that a peripheral does not generate a sync pulse.

Table 1 below summarizes the format codes and data field lengths which may be utilized in one embodiment of the communication net as more fully described hereafter.

TABLE 1

| Format Code Hexadecimal | Length Of Data Field In Bits | Message Type | Use or Meaning |
| --- | --- | --- | --- |
| 00H | 0 | Command | General poll/no change |
| 01H | 0 | Command | Broadcast on |
| 02H | 0 | Command | Broadcast off |
| 03H | 2 | Data | 2 bits in data field |
| 04H | 4 | Data | 4 bits in data field |

TABLE 1-continued

| Format Code Hexadecimal | Length Of Data Field In Bits | Message Type | Use or Meaning |
|---|---|---|---|
| 05H | 6 | Data | 6 bits in data field |
| 06H | 6 | Data | 8 bits in data field |
| 07H | 10 | Data | 10 bits in data field |
| 08H | 12 | Data | 12 bits in data field |
| 09H | 16 | Data | 16 bits in data field |
| OAH | 20 | Data | 20 bits in data field |
| OBH | 24 | Data | 24 bits in data field |
| OCH | 32 | Data | 32 bits in data field |
| ODH | 40 | Data | 40 bits in data field |
| OEH | 48 | Data | 48 bits in data field |
| OFH | 64 | Data | 64 bits in data field |
| 10H | 0 | — | — |
| 11H | 0 | — | — |
| 12H | 0 | Command | Function 1 |
| 13H | 0 | Command | Function 2 |
| 14H | 0 | Command | Function 3 |
| 15H | 0 | Command | Function 4 |
| 16H | 0 | Command | Function 5 |
| 17H | 0 | Command | Function 6 |
| 18H | 0 | Command | Function 7 |
| 19H | 0 | Command | Function 8 |
| 1AH | 0 | Command | Function 9 |
| 1BH | 0 | Command | Forced Poll |
| 1CH | 0 | Command | Device enquire |
| 1DH | 0 | Command | Group poll |
| 1EH | 0 | Command | Acknowledge |
| 1FH | 0 | Command | — |

Message Structure

As previously indicated, the communication net employs a protocol wherein messages comprise the following fields: sync, start, format code, address, parity, data, and checksum.

The sync field is a negative going pulse between 36 vdc and a "third" logic level, 0 vdc. The sync pulse signals the beginning of a new message from the central panel. It also provides an asynchronous reset for the peripheral circuits as described hereafter. The sync pulse, then, may be used to terminate any messsage that is in the process of being transmitted by a peripheral over the communication lines.

The start field is a 1 bit logic "1" which is generated at the beginning of every peripheral message.

The format code is 5 bits long. It identifies a particular function when it appears in a command message. For example, format code 00H (hex) designates a general poll, format code 01H designates a broadcast "on" poll, and code 02H designates a broadcast "off" poll, etc. These latter format codes always designate the same function to all peripherals, regardless of the type of devices being monitored or controlled by the peripheral. On the other hand, certain format codes may be used to specify a function which is unique to a particular peripheral, such as the format codes 12H-1AH. Thus, a particular peripheral may be monitoring or controlling a unique device and the format code employed (to command that peripheral to perform a particular function associated with the device) may be used to command a different periperal to perform yet a different function. For these types of format codes, then, no two peripherals need respond in the same way. When it appears in a data message, the format code specifies the length of the data field. It should be noted that the format code never identifies a peripheral.

The address field follows the format code in all messages. The address field is 8 bits long. The address field identifies the peripheral or, as will be described hereafter, a group of peripherals.

The parity field P in any message follows the address field. It is 1 bit long, having odd parity based on the number of "1"s in the format code and address fields.

The data iield follows the parity field in all data messages. The data field is variable in length, and its length is specified by one of the format codes 03H through 0FH. See Table 1. The data field provides information as to the status of the digital devices being monitored by the peripheral, control information as to the output devices being controlled by the peripheral, and digitized information as to the output of an analog device being monitored by the peripheral.

The checksum field follows the data field in all data messages. This is a 5 bit field which is provided to signal any error in data transfer. The checksum code is the modulo 32 sum of the logic "1"s in the format code, address, parity and data fields. It does not appear in a command message.

General Poll

A general poll message from the central panel is specified by format code 00H. See Table 1. The general poll is used to request a status report from a specific peripheral. Its structure is shown in waveform (a) of FIG. 3. The address field of the general poll uniquely identifies a peripheral. If the peripheral detects an error in the central panel message, it does not send any response to the central panel. Upon receiving a valid general poll, however, the periphral determines whether there has been a change in status of any of the digital devices which it is monitoring; and it respodds if all previous reports have been acknowledged by the central panel, as described hereafter.

Figure 13A:
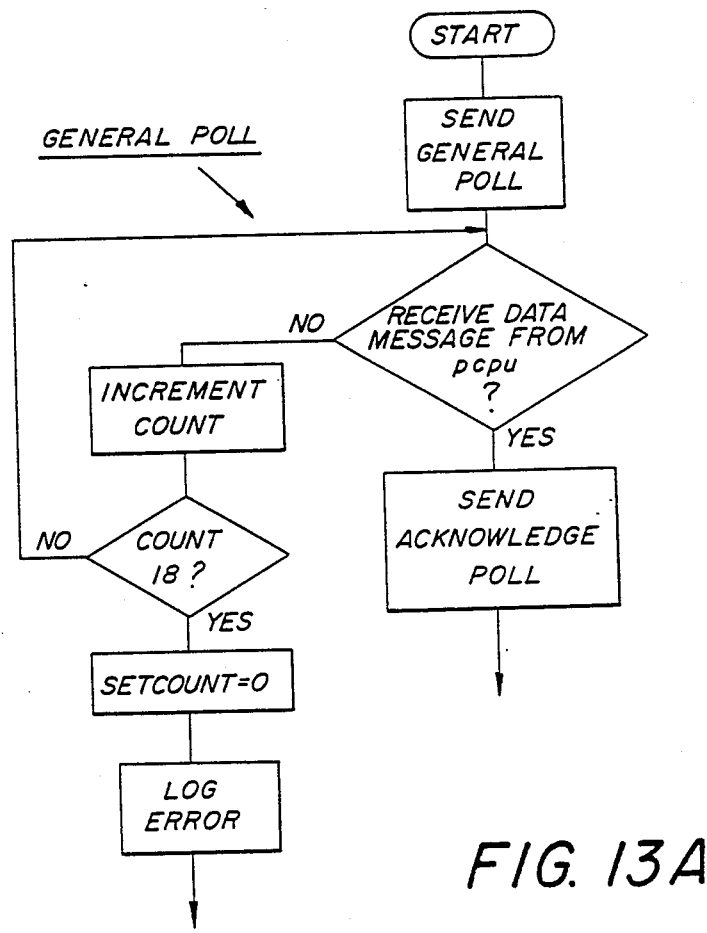
FIGS. 13A–D comprise a flow chart of the central panel cpu operation for various polls.

If there is no change in the status of any monitored digital device, the peripheral responds with a command message having the same format code 00H as in the general poll message received from the central panel. See Table 1. This format code indicates that there has been no change in the status in any of the monitored digital devices. If, on the other hand, the status of any monitored digital device has changed since the last report, the peripheral will transmit a data message to the central panel. The data field in the message reports the state of all monitored digital device outputs. Central panel cpu operation during a general poll is shown in the flow chart in FIG. 13A. After receiving a data message frmm the peripheral, the central panel will respond with an acknowledge poll. If the central panel does not receive a response to a general poll from the peripheral, it will time out and log an error. Until the peripheral receives an acknowledge poll from the central panel, it will continue to send the same data message in response to all subsequent polls by the central panel.

Operation of the peripheral as described above may be explained in greater detail in connection with the pcpu block diagram shown in FIG. 5. A general poll sync pulse is transmitted by the central panel over lines 12. The sync pulse reset or clears a phase offset circuit 14, a bit counter 16, and a Tx/Rx select circuit 18 at the peripheral. When Tx/Rx select circuit 18 is reset by the sync pulse, it generates a Tx/Rx logic signal which disables output register 26 and which is inverted so as to enable input register 24. This places the pcpu in the receive mode.

Phase offset circuit 14 receives a pulse train which is generated by a crystal clock 20 and divided down by a ÷256 frequency divider 22. The offset circuit generates three 90° phase shifted pulse streams designated 0°, 90° and 180° in FIG. 5. The duty cycles and frequencies of the pulse trains are the same. Bit counter 16 is clocked by the 180° pulse stream. The 0° pulse stream clocks the input and output registers 24, 26. The 90° pulse stream clocks a drive circuit 28 coupled to output register 26.

Upon receipt of a general poll message, the format code, address and parity bits appear at the In input of the pcpu and are clocked into input register 24. The format code and parity bit, 6 bits in all, are fed in parallel from the input register to a check & select circuit 30 for validation. The check & select circuit includes a comparator (format compare) for validating the received format code by comparing the code to a set of valid format codes stored in pcpu memory (valid format memory code table). See FIG. 6B. If a match is detected, the format compare circuit generates a format match (FM) signal. The check & select circuit also includes a sum circuit 32 (FIG. 6B) which sums the number of logic "1"s in the format code and address fields which were loaded into the input register and compares the least significant bit (LSB) of the sum with the parity bit loaded into the register. If there is no match, this indicates correct, odd parity, and the parity compare circuit generates a parity match (PM) signal. See FIG. 6B. The check & select circuit also includes a bit count memory table containing the digital counts 14 and 15, 21-83, 22-84 and 32. Each count is employed in a different mode of operation of the pcpu as described hereafter.

When the entire general poll message has been loaded into the input register, bit counter 16 will have reached a count of 14 corresponding to the 14 bits in the message. The count is compared with the count selected from the bit count table in check & select circuit 30 by a comparator (receive compare) in Tx/Rx select circuit 18. See FIG. 7. The count selected from the bit count table is determined by the state of the Tx/Rx line, the received format code which has been loaded into the input register, and a change/ no change (C/NC) signal. The state of the Tx/Rx line indicates whether the pcpu is in the transmit or receive mode. The received format code indicates the type of action required of the peripheral. The C/NC signal indicates whether the output of any device monitored by the peripheral has changed since the last report by the peripheral. Th C/NC signal is described in greater detail hereafter. It plays no part in the selection of a bit count when the Tx/Rx signal places the pcpu in the receive mode.

If the Tx/Rx signal enables the input register, so as to place the pcpu in the receive mode, and if the received format code indicates that the message received from the central panel is a command message, a data select circuit 34 in check & select circuit 30 transmits count 14 from the bit count table to the receive compare circuit in Tx/Rx select circuit 18. See FIGS. 6A and 7. The output of the receive compare circuit enables an AND gate 36 when bit counter 16 reaches the count of 14. The AND gate toggles a flip-flop 38 via OR gate 42, so as to switch the Tx/Rx signal whereby the input register 24 becomes disabled while output register 26 becomes enabled. This places the pcpu in the transmit mode. The AND gate 36 will not toggle flip-flop 38 unless the format compare and parity compare circuits (FIG. 6A) also indicate a valid format code and paiity bit received in the input register, and, in addition, unless an address check comparator 44 (FIG. 5) indicates a match between the 8 bit address received in the input register and an 8 bit address stored in pcpu memory. The stored address uniquely identifies the peripheral. If an address match is detected, the address check comparator generates an address match (AM) signal. If any of the FM, PM and AM signals do not indicate a match, implying an error in the received message, AND gate 46 and AND gate 62 keep AND gate 36 disabled so that flip-flop 38 cannot be toggled. The pcpu is therefore frozen in the receive mode, and no message can be transmitted by the pcpu. If, however, the received format code, address and parity bit are all valid, implying no error in the received message, then the FM, PM and AM signals enable AND gate 36 via AND gate 46 and OR gate 47 (FIG. 7) so that AND gate 36 is free to toggle flip-flop 38 and place the pcpu in the transmit mode in response to the output of the receive compare circuit.

The output of OR gate 42 is also an enable output control (EOC) signal which enables the line drive circuit 28. See FIGS. 5 and 7. The line drive circuit interfaces the output register with the Out line of the pcpu. It will be recalled that the Out line drives FET 14 which is coupled across the communication net lines 12 (FIG. 4). When the Tx/Rx signal is changed so as to enable output register 26 and place the pcpu in the transmit mode, the output register is loaded and the contents of the output register are clocked by the 0° pulse stream to the drive circuit and, from there, by the 90° pulse stream to the Out line. The contents of the output register comprise the message to be transmitted: the 5 bit format code selected by the check & select circuit 30 for transmission to the central panel, the stored 8 bit address unique to the peripheral, a parity bit generated by the output register 1-64 data bits if there is a change to report in the status of the monitored devices, and a 5 bit checksum field also generated by the output register if a data field is generated. The checksum field is not generated if there is no data field to be transmitted.

Figure 12:
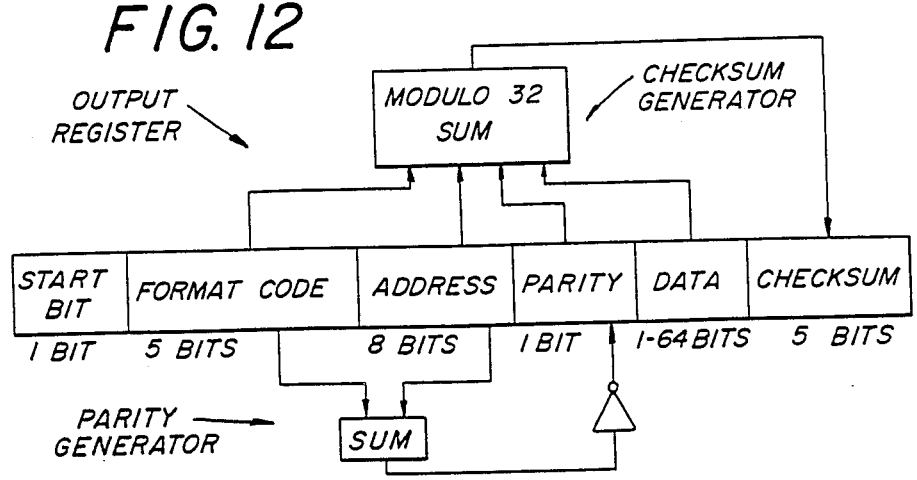
FIG. 12 is a block diagram of the parity and checksum generators at the output register.

The parity and checksum fields are generated at the output register as shown in FIG. 12. The parity bit generator sums the "1"s in the format code (5 bits) and address (8 bits) fields in the output register and transmits the complement of the least significant bit (LSB) of the sum to the parity field (1 bit). The checksum generator takes the modulo 32 sum of "1"s in the format code, address, parity and data (2-64) fields in the output register and transmits the sum to the checksum field.

The message which is transmitted by the pcpu to the net lines 12 will either be 15 bits long as shown in waveform (c) of FIG. 3 or 22-84 bits long as shown in waveform (d) of FIG. 3. The size of the message depends on whether a change has been detected in the status of any of the monitored devices and, if so, on the length of the data field to be transmitted to the central panel. The length of the data field is determined by the number of inputs to the input control circuit. A change in the status of the monitored devices is detected by an input control circuit 46 (FIG. 5) and is indicated by the C/NC signal.

Figure 10:
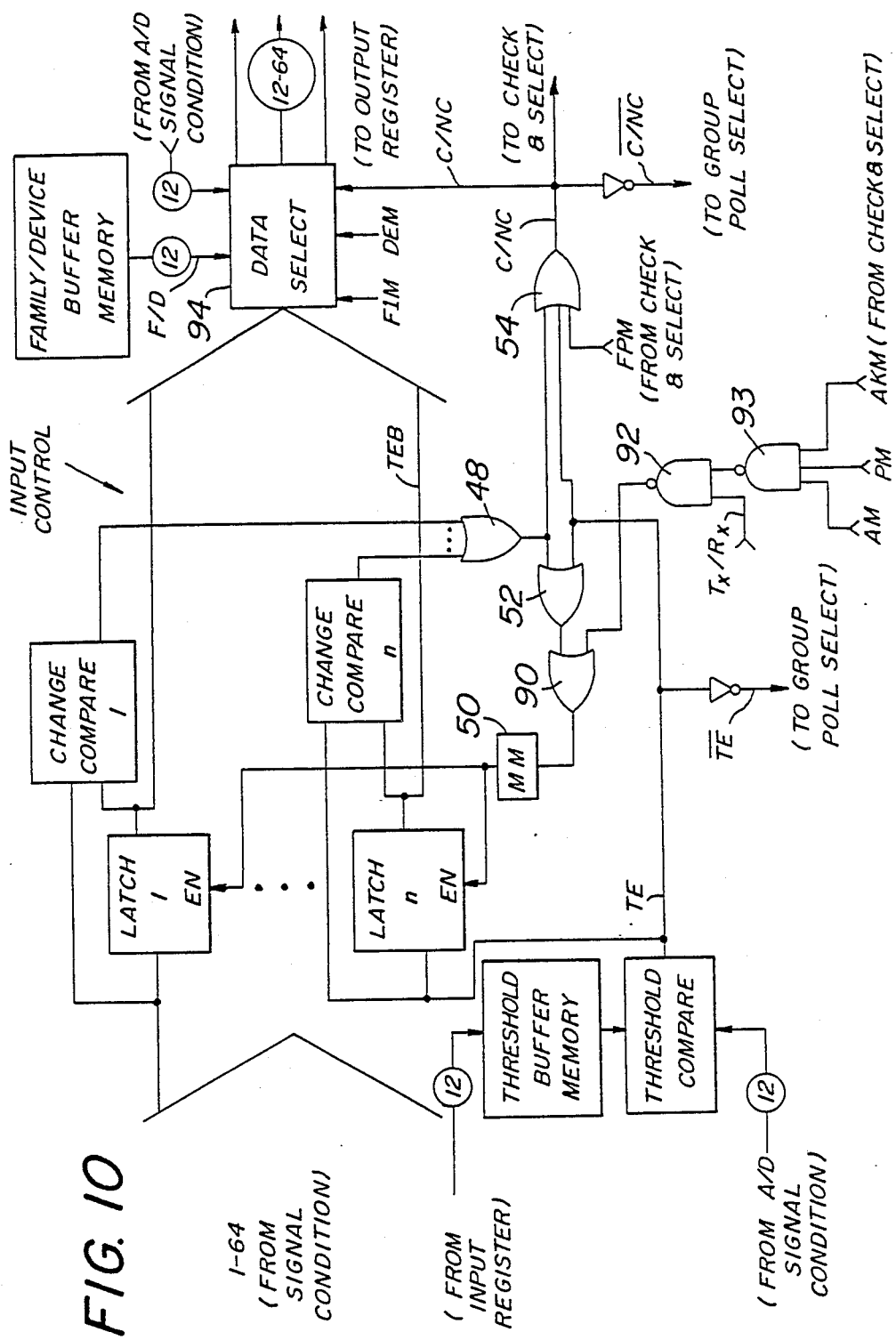
FIG. 10 is a block diagram of the peripheral input control circuit.

The input control circuit is shown in detail in FIG. 10. The input control circuit includes a bank of input latches 1-n where n=1-64. The input of each latch is coupled to one of the output lines of the signal condition circuit which represents a digital device output and to an output of a threshold compare circuit (described hereafter). When enabled, a latch transfers the signal at its input (logic "1" or "0") to its output. While the latch is disabled, the output stays constant while the input is free to vary. The input and output of each latch are coupled to a comparator (change compare) in a bank of comparators 1–n. The change compare outputs are fed to an OR gate 48. If any change compare circuit detects a change at the input of its associated latch, so that the latch input and output do not match, the circuit triggers a monostable multi (MM) circuit 50 via OR gates 48 and 52 and an AND gate 90. The MM circuit temporarily enables all n latches. In addition, the output of OR gate 48 is transmitted by OR gate 54 as the C/NC signal to a data select circuit 94 in the input control circuit. In response, the data select circuit transmits all latch outputs to the output register.

The C/NC signal is also transmitted to the check & select circuit 30 so that the appropriate bit count and format code can be selected for use in the transmission code. See FIGS. 6A and 10. The C/NC signal, and the format code received in the input register, control a data select circuit 56 in the check & select circuit. See FIG. 6A. The data select circuit selects a format code for transmission to the central panel from a transmit format code memory table. The table contains the format codes 00H and 03H–0FH which are used by the pcpu in transmitting messages back to the central panel. If the status of no monitored device has changed, as indicated by the C/NC signal, data select circuit 56 transmits format code 00H as a 5 bit (parallel) binary code to the output register. See FIGS. 5 and 6A. The command message shown in waveform (c) of FIG. 3, with format code 00H, is then serially transmitted to the Out line via line drive circuit 28. The message includes a start bit, which is always a logic "1" preset in the output register.

Figure 6A:
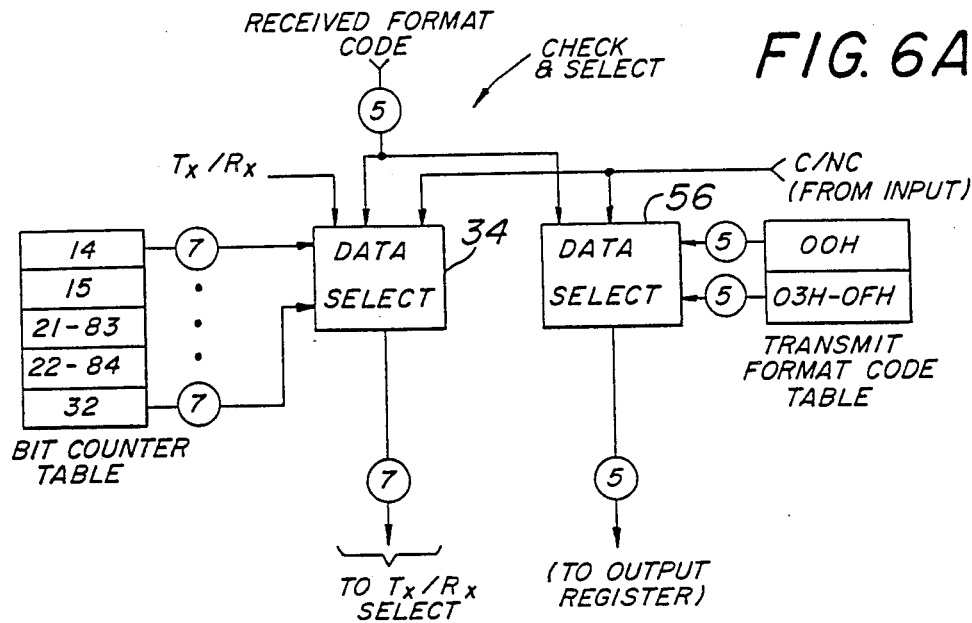
FIGS. 6A and 6B comprise a block diagram of the peripheral check & select circuit which validates format codes, selects format codes for transmission and determines the length of a transmission.
Figure 7:
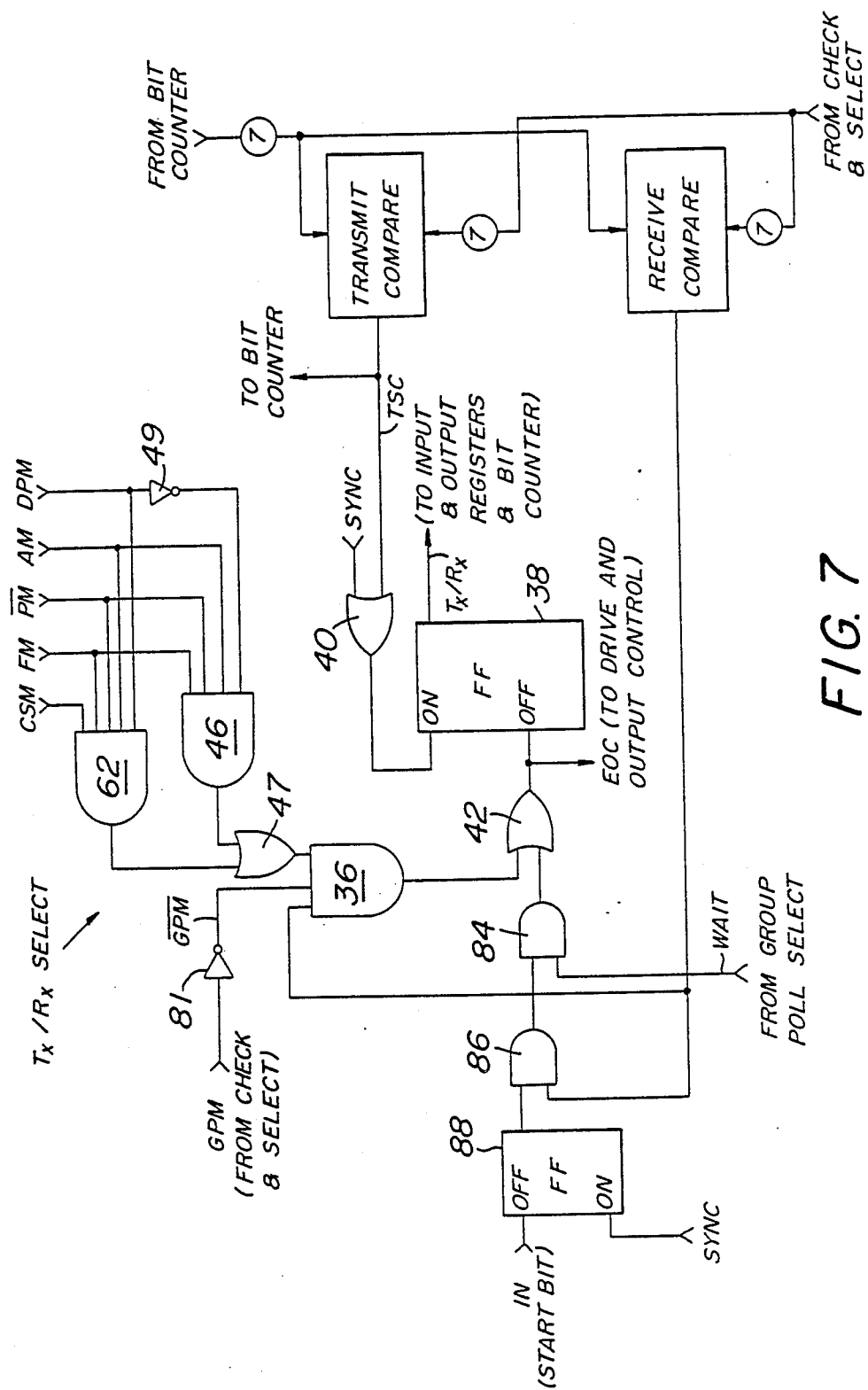
FIG. 7 is a block diagram of the peripheral Tx/Rx select circuit.

When the Tx/Rx signal enables the output register, so as to place the pcpu in the transmit mode, the signal also resets bit counter 16 via monostable multi (MM) 58 and OR gate 60. See FIG. 5. If the C/NC signal indicates no change in status of the monitored devices, the Tx/Rx signal causes the data select circuit 34 (FIG. 6A) to transmit a count 15 from the bit count memory table to a transmit compare circuit (FIG. 7) in Tx/Rx select circuit 18 (FIG. 7). The transmit compare circuit compares the selected count to the running count in bit counter 16. When the bit counter reaches 15, the transmit stop count (TSC) output of the transmit compare circuit toggles flip-flop 38 via OR gate 40 so that the Tx/Rx signal again changes state, re-enabling the input register 24 while disabling output register 26. Accordingly, the pcpu transmits the 15 bit command message, start bit, format code 00H, stored address, and parity bit, and then returns to the receive mode. The TSC signal also toggles a FF 61 (FIG. 5) via an OR gate 63. The flip-flop therefore disables bit counter 16 via OR gate 60 so that the pcpu stays hung up in the receive mode until the next sync signal is received.

If, however, the status of at least one monitored device has changed when the general poll is received, the C/NC signal indicates the same (FIG. 10) and the data select circuit 56 (FIG. 6A) selects a different format code from the transmit format code memory table. The particular format code selected will be one of the codes 03H–0FH, depending on the length of the data field to be transmitted. This is the same as the number of inputs to the input control circuit 46 (FIG. 5). The number of inputs is known beforehand. The number is indicated by one of the format codes (03H–0FH) stored in the transmit format code memory table. That format code is therefore selected by circuit 56 and then inputed to the output register 26 in the manner already described.

The data select circuit 34 (FIG. 6A) must also select a new bit count which represents the length of the message to be transmitted to the central panel. The length of the message depends on the length of the data field which, as explained above, will be known beforehand and may be between 2 and 64 bits long. The message to be transmitted will therefore be 22–84 bits long. The selected bit count (22–84) is transmitted by the data select circuit 34 (FIG. 6A) to the transmit compare circuit in Tx/Rx select circuit 18 (FIG. 7). When bit counter 16 reaches the selected count (22–84), the entire data message will have been transmitted to the central panel. The transmit compare output TSC (FIG. 7) then toggles flip-flop 38 via OR gate 40. This switches the Tx/Rx output of the flip-flop and thereby re-enables input register 24 while disabling output register 26. The TSC signal also disables bit counter 16, a previously explained. The pcpu is thereby returned to the receive mode and stays hung up in that mode until the next sync signal is received.

It should be noted, that during transmission back to the central panel, the input latches 1–n (FIG. 10) are kept disabled by an AND gate 92 which prevents monostable multi 50 from being re-triggered during transmission. The latches 1–n are freed by AND gate 92 only after an acknowledge command message is received from the central panel.

Acknowledge Poll

After receipt of a message from a peripheral, the central panel generates an acknowledge poll message. This is a command message in the form shown in waveform (a) in FIG. 3. The message includes a format code lEH. Until the acknowledge message is received from the central panel, the pcpu input control circuit (FIG. 10) freezes the latches 1–n so that the latch outputs do not change. This prevents a change in the latch outputs during transmission, and it saves the latch outputs should a re-transmission be necessary due to an error in the original transmission.

Figure 5:
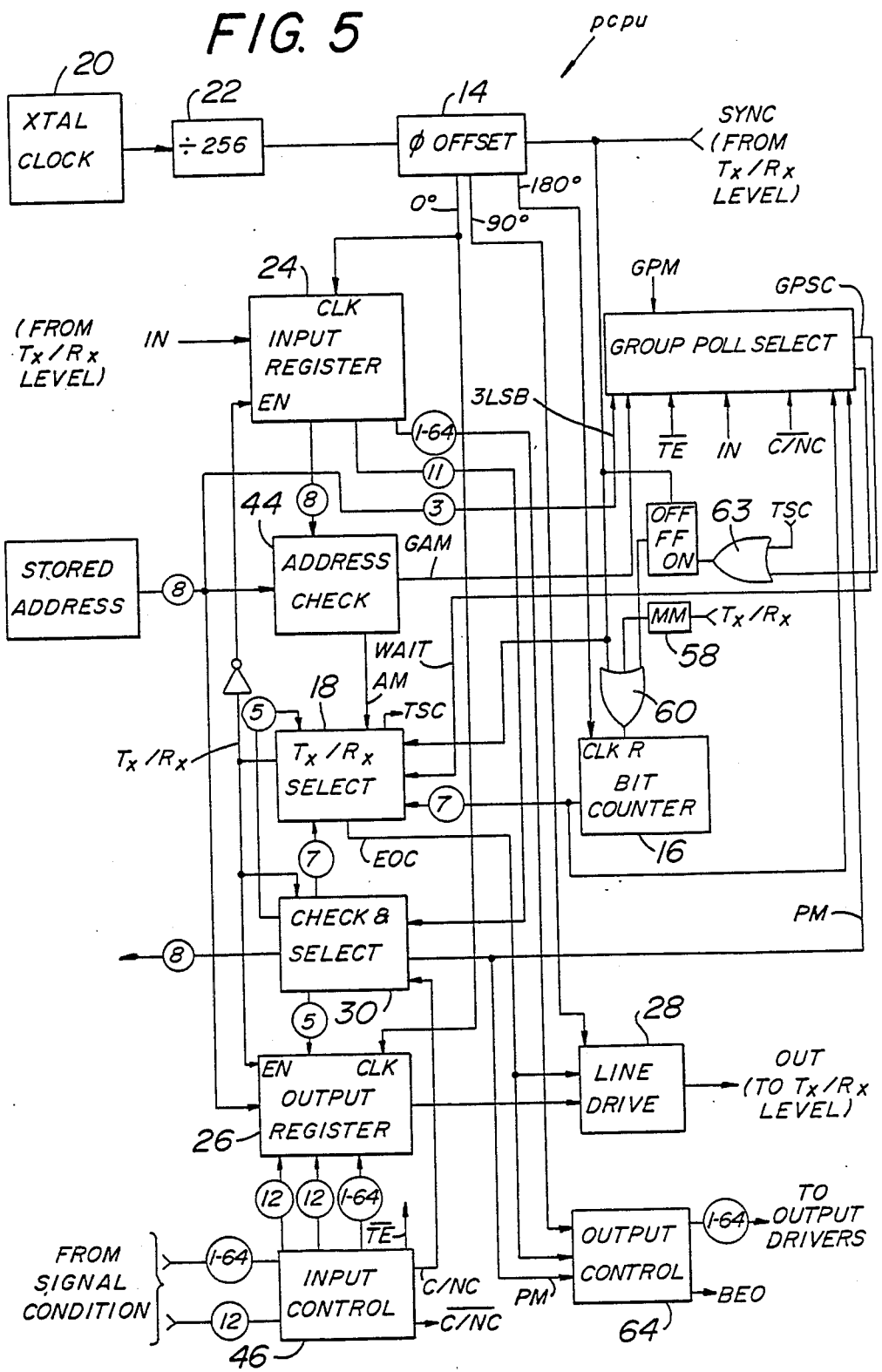
FIG. 5 is a block diagram of the peripheral cpu.

When the acknowledge command message is received, the acknowledge format code, address and parity bit are validated by the format compare and parity compare circuits (FIG. 6B) and the address check circuit (FIG. 5). If the format compare circuit detects a match between the received format code and the acknowledge format code stored in the valid format code memory table, the format compare circuit generates an acknowledge match (AKM) signal. The parity compare circuit generates the PM signal to indicate a valid parity bit, and the address check circuit generates the AM signal to indicate a valid address. The AKM, AM and PM signals are combined and inverted at NAND gate 93. See FIG. 10. This disables NAND gate 92 and frees AND gate 90 and monostable multi 50 so as to enable the latch outputs to change in response to the outputs of the change compare circuits 1–n or in response to TE signal (described hereafter).

Data Poll

Figure 13B:
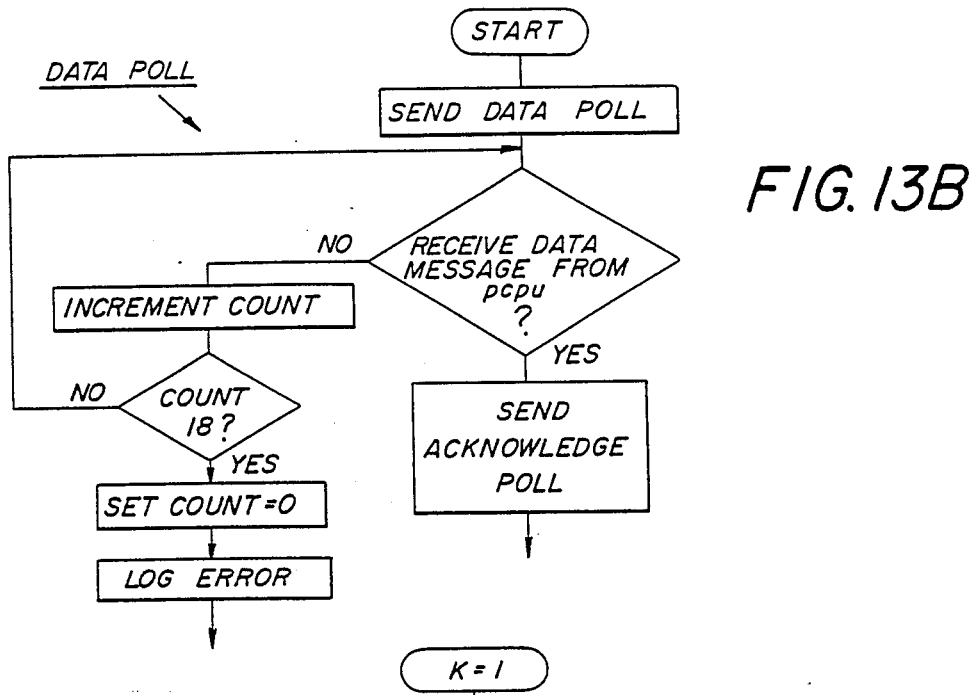

The data poll message is used to transmit data from the central panel to a peripheral so as to enable the peripheral to control various output devices (FIG. 2). The data poll is a data message which takes the form shown in waveform (b) in FIG. 3. The format code of the data poll message is one of the format codes 03H-0FH depending on the length of the data field in the message. The pcpu controls the output devices based on the control information in the data field. The data poll includes an "implied" general poll in that the pcpu is also expected to report as to whether there has been a change in status in any of the monitored devices. If the data poll is received at the peripheral with an error in any of the format code, address, parity or check sum fields, the pcpu will not enter the transmit mode, i.e., it will not answer. After a bit count of 18, the central panel will log an error and subsequently retransmit the data poll to the peripheral. The flow chart for central panel operation during a data poll is shown in FIG. 13B.

Upon receipt of the data poll format code, the format compare circuit (FIG. 6B) compares the received code to the codes stored in the valid format code memory table. If the format compare circuit detects a match, the circuit generates a data poll match (DPM) signal. The DPM signal appears at the input of the Tx/Rx select circuit 18 (Figure 7). The DPM signal enables AND gate 62 while disabling AND gate 46 via inverter 49. AND gate 62 also receives the FM, PM and AM signals, which indicate format code match, parity match and address match, and a CSM signal which indicates a checksum match. The CSM signal is generated by a comparator (checksum compare) in check & select circuit 30 (FIG. 6B) when a match is detected between the received checksum field and the modulo 32 sum of logic "1"s in the received format code, address, parity bit and data fields. If no error has been detected in any of the received message fields, AND gate 62 (FIG. 7) enables AND gate 36 (via OR gate 47) to toggle flip-flop 38 at the appropriate time as determined by the receive compare circuit. It will be recalled that the receive compare circuit enables AND gate 36 when bit counter 16 has reached a count selected by data select circuit 34 (FIG. 6A), which indicates the length of the message received from the control panel. When toggled, the flip-flop Tx/Rx output enables the output register and places the pcpu in the transmit mode.

A data poll message is 21-83 bits long, depending on the length of the data field. The length of the data field depends on the number of output devices to be controlled. Data select circuit 34 must therefore select a bit count of 21-83 bits from the pcpu bit count memory table to receive the full data poll. It does so in response to the data poll format code which indicates the length of the received data field, hence the length of the data poll message. When the selected count (21-83) is reached, indicating that the full data poll message has been loaded into the input register, flip-flop 38 (FIG. 7) is toggled, and the Tx/Rx signal thereby changes state so as to disable the input register while enabling the output register. The pcpu is now in the transmit mode. At the same time, the EOC signal generated by OR gate 42 (FIG. 7) enables line drive circuit 28 and the output control circuit 64 (FIG. 5). The line drive circuit 28 transmits the output register contents to the pcpu Out line as previously described in connection with a general poll. The contents of the output register are the start bit (preset into the register), the format code selected for transmission (as previously explained in connection with a general poll), the stored address, the parity bit, and the data and checksum fields (if there is a change in monitored device status to report).

Figure 8:
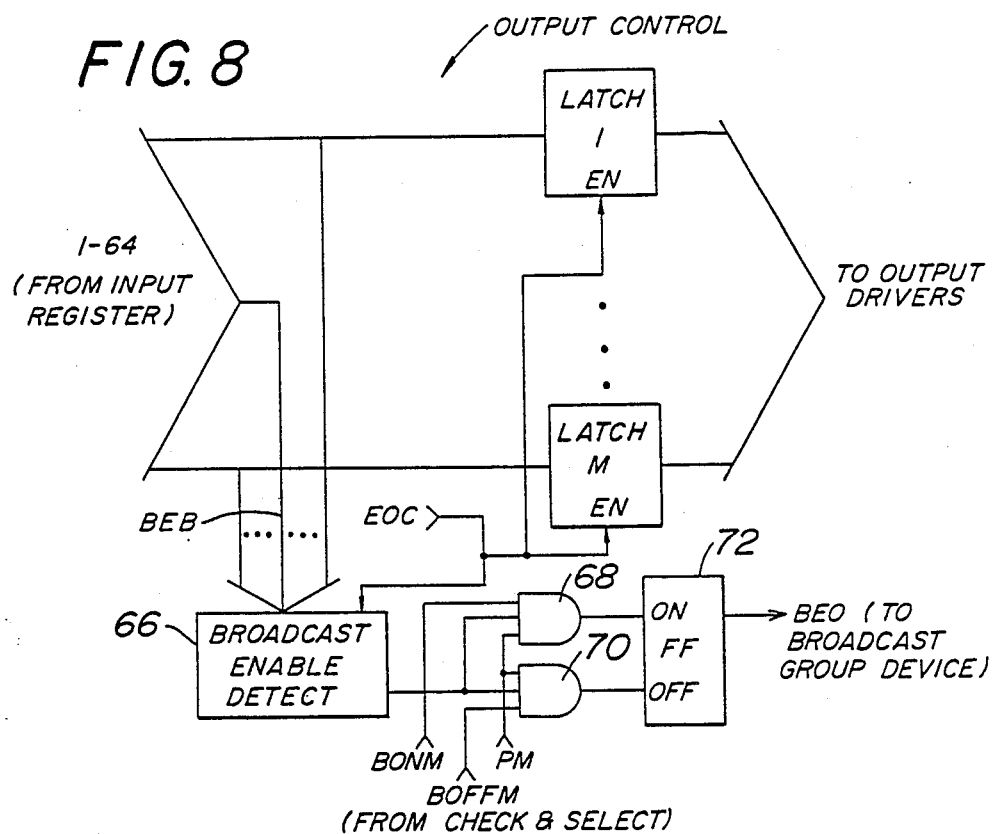
FIG. 8 is a block diagram of the peripheral output control circuit.

In addition, the pcpu transfers the data field in the input register to the output devices, via output control circuit 64, so as to control the output devices as instructed by the central panel. The output control circuit is shown in detail in FIG. 8. The circuit includes a bank of output latches 1 through m where m=1-64. The number m corresponds to the number of bits in the data field received at the input register 2, there being at most one output latch for each bit. Each output latch drives one input of an output driver. Each driver may operate an on/off device such as a relay, or a particular number of drivers may operate a multiple input device such as an alphanumeric CRT display. The number of devices to be controlled by the peripheral is known beforehand. The EOC signal enables the output latches 1-m, and the latch outputs assume the state of the latch inputs. Accordingly, the output devices are driven in accordance with the data transmitted to the peripheral by the central panel.

Broadcast Poll

The broadcast poll is a special purpose command message transmitted by the central panel when the communication net is required to turn on or turn off a number of devices at the exact same time. An example would be the operation of a group of bells to sound an audible code so as to signal an alarm. The bells can be turned on and off so as to form an audible pattern which indicates the cause of the alarm and the location of the alarm in a particular zone. The broadcast poll is effected by the use of two format codes: the broadcast on code (01H) and the broadcast off code (02H).

Figure 13D:
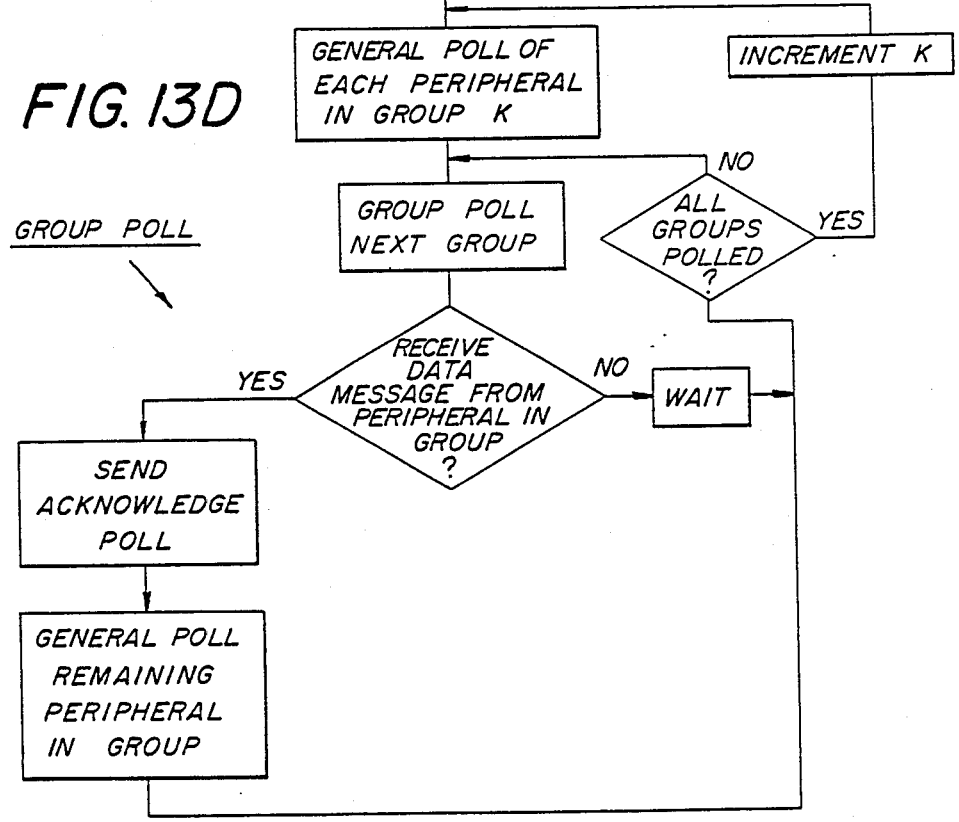
Figure 13C:
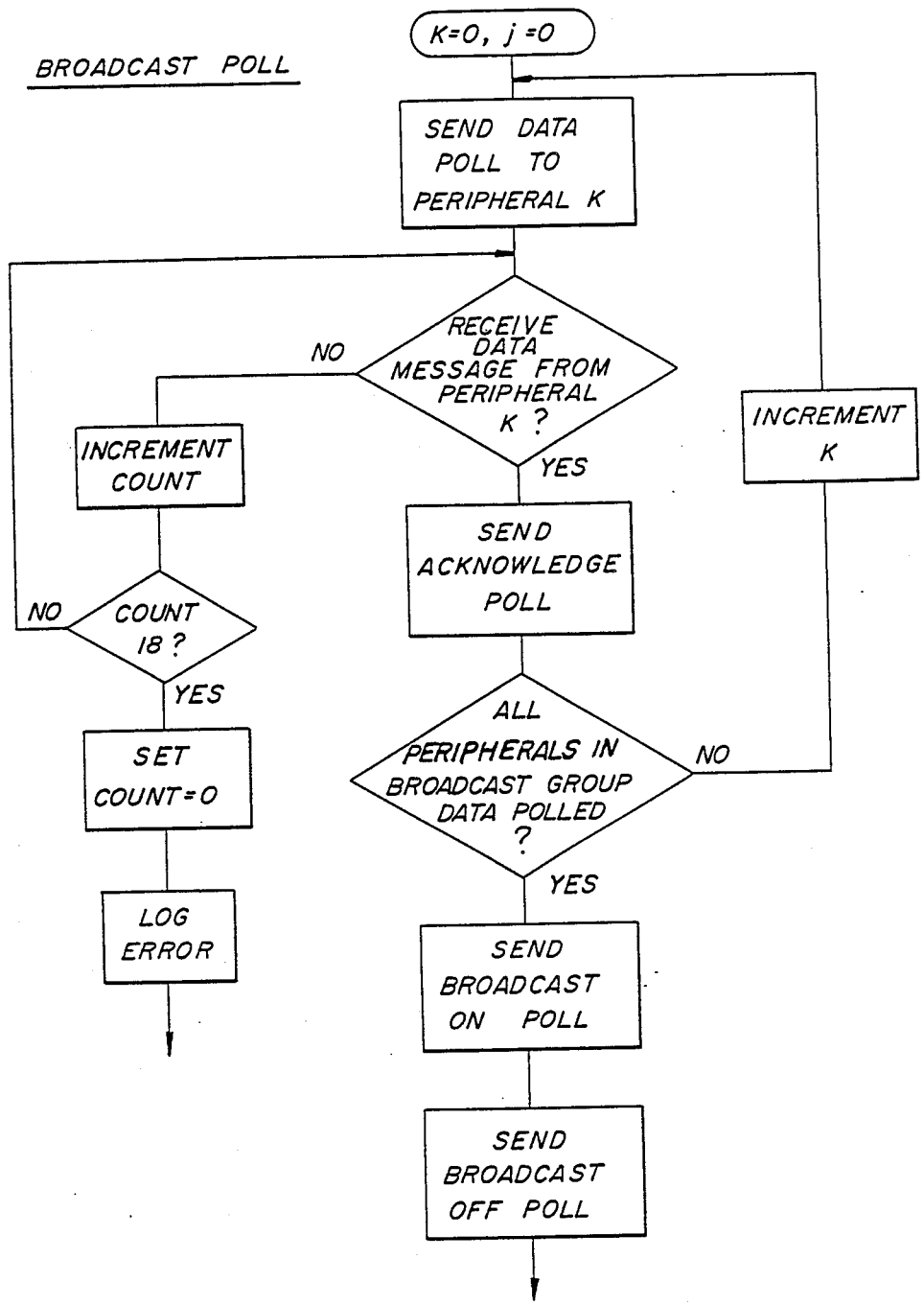

Before the broadcast on or broadcast off format codes are transmitted to the peripheral, however, all peripherals in the broadcast group must be sequentially enabled by appropriate data poll messages from the central panel. After all peripherals in a broadcast group have bee enabled by the central panel, the central panel transmits the broadcast on or broadcast off command messages. The broadcast on and broadcast off messages may be sent to any peripheral address, within or without the broadcast group. The peripheral which is addressed by the broadcast on or broadcast off message will respond in the normal manner, by sending a command message as shown in waveform (c) in FIG. 3 or by sending a data message as shown in waveform (d) in FIG. 3, depending on whether there has been a change in the status of any of the devices monitored by the peripheral. If no peripheral responds to the message, the central panel will retransmit the broadcast on or off message at least once. Central panel operation during the broadcast poll is shown by the flow chart in FIG. 13C.

To enable each of the broadcast group peripherals, the central panel sends a data poll message as shown in waveform (b) in FIG. 3. The data message includes the appropriate format code 03H-0FH as previously explained. In addition, the message includes a broadcast enable bit (BEB) in its data field. The broadcast enable bit occurs at a predetermined bit position in the data field. It is detected by the broadcast enable detect circuit 66 when the EOC signal is generated. See FIG. 8. If the data message is received error-free, AND gate 62 (FIG. 7) enables AND gate 36 (via OR gate 47) to generate the EOC signal (via OR gate 42) at the appropriate time as determined by the output of the receive compare circuit. Upon detecting the BEB signal, the broadcast enable detect circuit (Figure 8) enables a pair of AND gates 68, 70. Once enabled, the AND gates 68, 70 can be triggered in response to a broadcast on or off message to toggle a flip-flop 72. The flip-flop has a broadcast enable output (BEO) which is normally off. In this manner, each peripheral is separately addressed by a data poll message and enabled, i.e., prepared for a broadcast on or broadcast off message.

When a peripheral is prepared for broadcast operation by a data poll as described above, the flip-flop 72 does not change state, and the flip-flop BEO output remains in its normally off state. To change the state of the BEO outputs of all broadcast group peripherals simultaneously, and thereby simultaneously actuate the devices being controlled by the broadcast group peripherals, the central panel sends successive broadcast on and broadcast off messages. These messages may be repeated as desired to form a particular audible pattern.

Figure 6B:
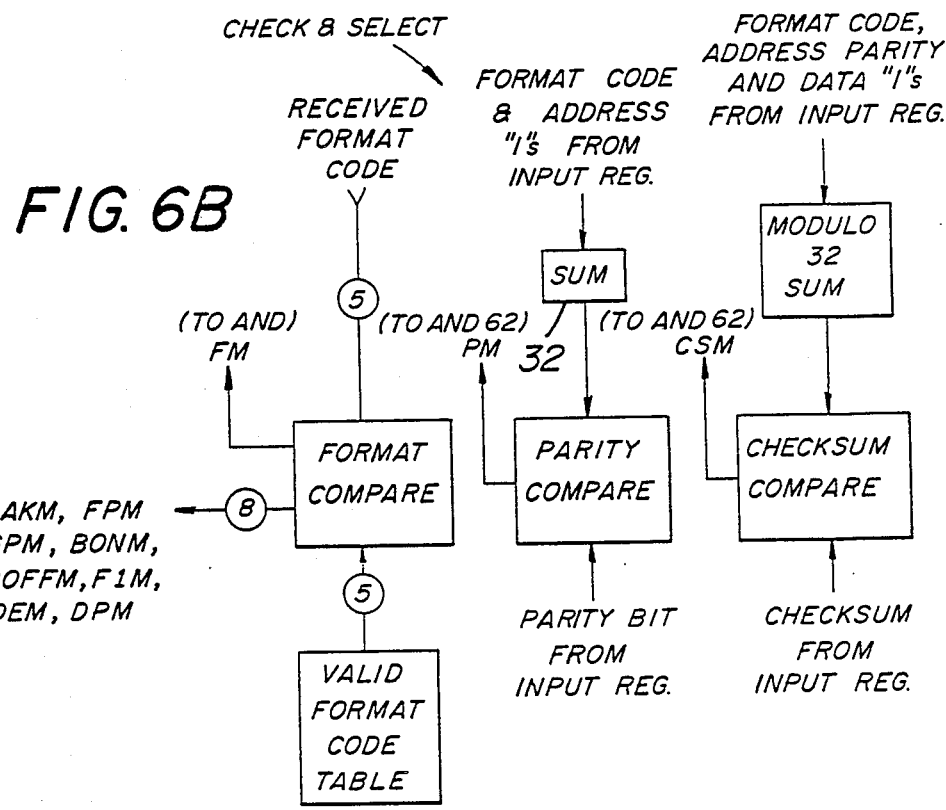

The broadcast on and broadcast off messages are command messages having the form of waveform (a) in Figure 3. A broadcast on format code is received a the input register 24 and is compared to a broadcast on format code in the valid format code memory table (FIG. 6B). If the broadcast on fommat code received at the input register is a valid broadcast on format code, the format compare circuit generates a broadcast on match (BONM) signal. This signal triggers AND gate 68 in the output control circuit (FIG. 8) if the parity compare circuit (FIG. 6B) has also detected a valid parity bit at the input register (as indicated by the PM signal). Note that a valid address detection is not required. When triggered, AND gate 68 toggles flip-flop 72 to turn the BEO output on. The BEO output is connected to the device (horn, siren, etc.) to be controlled by the broadcast group peripheral. All peripheral BEO outputs are thereby turned on at the same time so as to actuate all broadcast group devices at the same time in response to a single broadcast on message from the central panel.

To turn all broadcast group devices off at the same time, the central panel sends a second command message, the broadcast off message. This message has the broadcast off format code 02H. The broadcast off format code is received at the input register and checked by the format compare circuit (FIG. 6B). If the format compare circuit validates the received broadcast off format code, by detecting a match between the received format code and the broadcast off code stored in the valid format code memory table, it generates a broadcast off match (BOFFM) signal. The BOFFM signal triggers AND gate 70 (FIG. 8) if the parity compare circuit (FIG. 6A) has also detected a valid parity bit at the input register (as indicated by the PM signal). Again, a valid address detection is not required. When triggered, AND gate 70 toggles flip-flop 72 and returns the BEO output to its normally off state. As a result, the broadcast group device connected to the BEO line is turned off. All broadcast group peripheral BEO outputs are thereby turned off at the same time so as to turn off all broadcast group devices at the same tmme in response to a single broadcast off message from the central panel.

It should be appreciated that between broadcast on and broadcast off command messages, peripherals within or without the broadcast group can be polled by the central panel as in a general poll or a data poll.

Group Poll

The group poll is used for polling a group of peripherals at one time with a single group poll command message from the central panel. The group poll message is identified by the format code 1DH. A group of peripherals is addressed by the 5 most significant bits (MSBs) in the 8 bit address of the group poll message. All peripherals within the group have stored addresses having in common the 5 MSBs. When the 5 MSBs are recognized by the peripherals in the group, each peripheral begins a wait or timeout period. At the end of the wait period, the peripheral may or may not respond to the central panel depending on whether or not there is a change in status of a monitored device to report. The time-out period for a peripheral, in terms of clock bit times at the input of counter 16, is the 3 least significant bits (LSBs) of the peripheral address +15 bit times. Peripherals having lower LSBs therefore have higher priority in that they are able to transmit earlier. If a change in status has occurred for any of the devices monitored by a peripheral in the group, the peripheral will transmit an appropriate data message (in the manner already described in connection with a general poll) after its time-out period. However, if a higher priority peripheral in the group has begun to respond to the group poll message first, then the peripheral having the lower priority will not be able to respond at all.

If no device monitored by any of the peripherals in a group has experienced a change in status, then none of the peripherals in the group will answer the group poll message. The central panel will then transmit a group poll message for the next group of peripherals (if there is one).

If a peripheral in the group responds to the group poll, indicating a change of status of at least one of the devices monitored by the peripheral, then the central panel transmits a general poll for all remaining peripherals in that group. After each peripheral in the group has been general polled, thecentral panel transmits a group poll message for the next group (if there is one).

To ensure that each group of peripherals in a set of groups is general polled at least once during each cycle of group polls for the set, the central panel cpu is programmed to step through the groups, general polling a different group during each cycle. Operation of the central panel during the gooup poll is shown by the flow chart in FIG. 13D.

The operation of the pcpu in response to a group poll message is best explained in onnection with the group poll select circuit 74 (FIG. 9), the check & select circuit 30 (FIG. 6B) and the address check circuit (FIG. 5). Upon receipt of a group poll message from the central panel, the format compare circuit (FIG. 6B) confirms that a valid group poll format code has been received by comparing the received format code with the group poll format code in the valid format code memory table. If a match is detected, the format compare circuit generates a group poll match (GPM) signal. The address check circuit 44 (FIG. 5) compares the 5 MSBs of the group poll address to the 5 MSBs ff the stored address in pcpu memory. If the MSBs match, the address check circuit 44 generates a group address match (GAM) signal.

Figure 9:
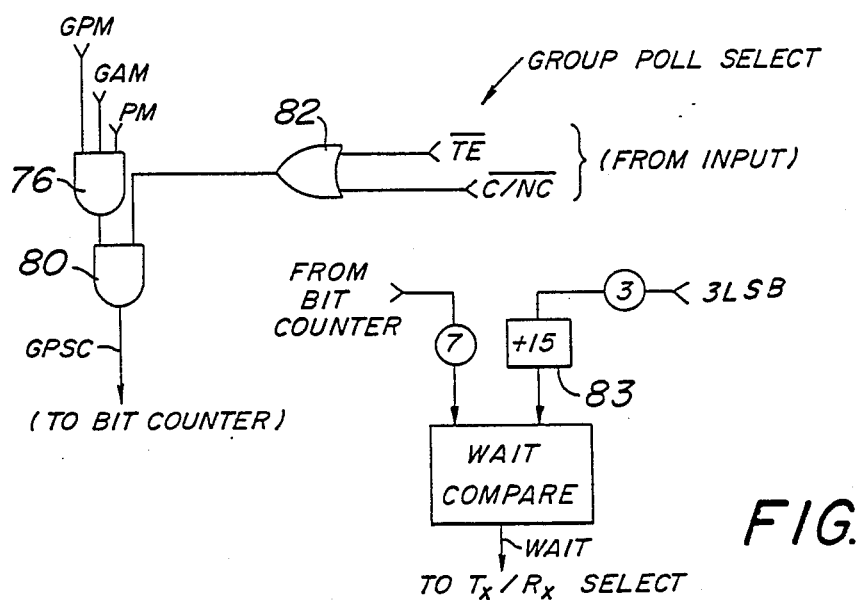
FIG. 9 is a block diagram of the peripheral group poll select circuit.

The GPM and GAM signals appear at the input of NAND gate 76 (FIG. 9). The GPM and GAM signals enable AND gate 76. If the parity bit received at the input register is validated by the parity compare circuit (FIG. 6B), the PM signal therefore causes AND gate 76 to enable an AND gate 80 (FIG. 9). If none of the devices monitored by the peripheral have experienced a status change, the $\overline{C/NC}$ signal also enables AND gate 80, via OR gate 82, to generate a group poll stop count (GPSC) signal. The GPSC signal disables the bit counter 16 via OR gate 63, flip-flop 61, and OR gate 60 (FIG. 5). The pcpu is therefore hung up in the receive mode, and no message can be transmitted by the peripheral to the central panel until the next sync pulse is received.

If, however, the peripheral has a change in status to report, the $\overline{C/NC}$ signal disables AND gate 80 (FIG. 9), via OR gate 82, whereby the GPSC signal does not disable bit counter 16. The bit counter therefore continues to count after the entire group poll message has been received at the input register. The count in the bit counter is compared by a comparator (wait compare) in the group poll select circuit (FIG. 9) with the sum of the 3 LSBs in the peripheral address +15. The sum is indicated by the output of adder 83. When the bit counter reaches the count of 3 LSBs +15, the wait compare circuit generates a WAIT signal. The WAIT signal indicates that the pcpu has timed out, and it enables an AND gate 84 in the Tx/Rx select circuit (FIG. 7). The other input of AND gate 84 is enabled by an AND gate 86 which in turn is enabled by the output of a flip-flop 88 (when the sync pulse is received) and by the output of the receive compare circuit (when a bit count of 14 has been reached). Accordingly, after the time-out period for the peripheral has been reached, AND gate 84 toggles flip-flop 38 via OR gate 42 so as to switch the Tx/Rx select output and enable the output register. This places the pcpu in the transmit mode. During the time out period, AND gate 36 is kept disabled by the $\overline{GPM}$ signal at the output of inverter 81 so that the pcpu stays in the receive mode. When AND gate 84 toggles flip-flop 38, at the end of the time out period, the appropriate data message is transmitted by the peripheral so as to report the status of the devices being monitored, in the manner previously explained in connection with a general poll.

If, at any time prior to generation of a WAIT signal by the wait compare circuit (FIG. 9), another, higher priority peripheral begins to transmit a message to the central panel, the start bit of that message will appear on the In line to the pcpu and will toggle a flip-flop 88 (FIG. 7) so as to disable AND gate 86 and thereby prevent the Tx/Rx output of flip-flop 38 from switching so as to enable the output register. Accordingly, the peripheral is hung up in the receive mode and cannot respond to the group poll message. Thus, in the communication net of the present invention, higher priority group peripherals have the ability to seize the communication lines and thereby prevent lower priority group peripherals from responding to the group poll.

Analog Threshold Group Poll

The analog threshold group poll is part of the group poll described above. It determines whether a threshold level has been reached or exceeded by any analog sensor being monitored by any of the peripherals in the group. In the previous description of pcpu operation during a group poll, the $\overline{C/NC}$ signal disabled bit counter 16 when there was no change to report in the status of a monitored digital device. The $\overline{C/NC}$ signal is formed at the input control circuit 46 as previously explained in connection with FIG. 10. The signal is formed based on the status of the outputs of the sensors being monitored by the peripheral as indicated by the change compare circuits 1-n.

To effect an analog threshold group poll, a comparator (threshold compare) is provided in the input control circuit. See FIG. 10. A 12 bit threshold is stored in the pcpu buffer memory and compared by the threshold compare circuit to the converted output of the analog sensor (as supplied by the a/d portion of the signal condition circuit). The stored threshold is initially supplied by the central panel in a data message. The threshold is received by the pcpu and is stored in the threshold buffer memory. The threshold compare circuit generates a threshold enable (TE) signal if the 12 bit converted analog sensor output matches the stored 12 bit threshold.

If the analog threshold has not been exceeded, the $\overline{TE}$ signal enables AND gate 80 (FIG. 9) via OR gate 82 so as to generate the GPSC signal and disable bit counter 16 (just as the $\overline{C/NC}$ signal would if there were no change to report). Accordingly, the pcpu is hung up in the receive mode and no message is transmitted to the central panel.

If the analog threshold has been reached or exceeded, however, the pcpu transmits a data message in the form shown by waveform (d) in FIG. 3. The data field in the message transmitted by the pcpu includes the TE bit (TEB) generated by the threshold compare circuit. See FIG. 10. Thus, if a peripheral monitors an analog sensor, the TE output of the threshold compare circuit is fed to the output register as one of the 64 possible data field input lines. The TE bit effectively displaces one of the 64 lines which might otherwise have been used to indicate the status of a digital sensor. Thus, the data message transmitted back to the central panel indicates that the analog sensor threshold has been reached or exceeded.

In the analog threshold group poll, the data message transmitted by the pcpu also includes information as to the status of each of the digital sensors being monitored by the peripheral. Update status information as to each of the digital sensors is provided by the input control circuit in response to the TE signal. See FIG. 10. Thus, the TE signal triggers the monostable multi 50 via OR gate 52 and AND gate 90 so as to enable all input latches 1-n. All latch inputs are then transmitted to the output register via data select circuit 94.

Note that for a general poll, data poll or broadcast poll, the TE bit will be transmitted to the output register and on to the central panel as part of the data field in the pcpu's reply whenever the C/NC signal indicates a change in monitored device status. However, whether transmitted in reply to a general poll, data poll, broadcast poll or group poll, the TE bit does not indicate the actual value of the analog sensor output. To obtai the actual value of the analog sensor output, it is necessary to transmit a forced analog poll message to the peripheral as described hereafter.

Forced Poll

The forced poll message is a command message having a format code 1BH. The forced poll requires the peripheral to send back a data message containing a report on the status of all digital sensors being monitored by the peripheral, whether or not there has been a change in the status of any of the sensors. The forced poll may be used particularly where the sensors being monitored change slowly. The peripheral monitoring such devices can be force polled at a relatively slow poll rate, and the general polls may be effected at a more rapid rate for other peripherals which monitor devices having outputs which change more rapidly.

The forced poll format code is validated by the format compare circuit (FIG. 6B) by comparing the received format code with the forced poll format code stored in the valid format code memory table. If a match is detected, the format compare circuit generates a forced poll match (FPM) signal. The FPM signal is fed to data select circuit 94 on the C/NC line output of OR gate 54. The FPM signal causes the data select circuit to transmit the outputs of input latches 1-n to the output register. The contents of tthe output register are then transmitted to the net lines as previously explained.

Forced Analog Poll

A peripheral which monitors an analog sensor may be commanded to transmit the 12 bit converted analog sensor output to the central panel, whether or not the output has changed, by one of the command messages F1-F9. For present purposes, it is assumed that the command message F1 is used. This message is transmitted from the central panel with a format code 12H. The format compare circuit (FIG. 6B) compares the received format code to the forced analog poll format code stored in the valid format code memory table. If a match is detected, the format compare circuit generates a match (FIM) signal. This signal causes the data select circuit 94 (FIG. 10) to transmit the 12 bit converted analog sensor output (from signal condition a/d) to the output register. The data select circuit 34 (FIG. 6A) ensures that the 12 bit converted analog sensor output is transmitted to the output register and on to the net lines by selecting a 32 bit count from the bit count memory table, based on the received forced analog poll format code, and by transmitting the 32 bit count to the transmit compare circuit (FIG. 7). The transmit compare circuit compares the count of bit counter 16 to the 32 bit count selected by data select circuit 34 and, when a match occurs at the end of a complete message transmission, toggles flip-flop 38 so as to switch the pcpu back to the receive mode while disabling the bit counter as already explained in connection with a general poll.

Device Enquire Poll

The device enquire poll is a command message which is used by the central panel to interrogate a peripheral so as to determine the general class or family of devices being monitored by the peripheral as well as the particular type of device within that family or class. For this purpose, each pcpu is provided with a 12 bit code which is stored in a family/ device buffer memory at the pcpu. The 6 MSBs of the code specify the device family or class. The 6 LSBs specify the device type. The family code may for example specify a cpu family, such as a particular custom chip family. The type code may specify a photodetector, ion detector, etc.

The data select circuit 94 transmits the 12 bit family/device code to the output register when the device enquire poll is validated by the format compare circuit (FIG. 6B). To do this, the format compare circuit compares the device enquire format code (1CH) stored in the valid format code memory table to the received format code. If a match is detected, the format compare circuit generates a device enquire match (DEM) signal. This signal causes the data select circuit 94 (FIG. 10) to transmit the 12 bit family/device code to the output register. From the output register, it is transmitted (as part of a 32 bit data message) to the net lines 12 in the manner already described in connection with a general poll. The 12 bit family/device code occupies the entire data field of the message. The data select circuit 34 (FIG. 6A) ensures that the 12 bit family/device code is transmitted to the output register by selecting a 32 bit count from the bit count memory table, based on the received device enquire format code, and by transmitting the 32 bit count to the transmit compare circuit (FIG. 7). The transmit compare circuit compares the count of bit counter 16 to the 32 bit count selected by the data select circuit 34 and, when a match occurs at the end of a complete message transmission, toggles flip-flop 38 so as to switch the Tx/Rx output and disable the output register while disabling the bit counter as already explained in connection with a general poll. This hangs the pcpu up in the receive mode after the contents of the output register have been transmitted to the net lines.

Fault Tolerance

The communication net 10 permits a peripheral to fail while allowing the remaining peripherals to communicate normally over lines 12. Fault tolerance is accomplished by placing resistor R4 at the source of FET 14 in the transmit circuit. See FIG. 4. Thus, the communication lines are only partially shorted by the FET to transmit a logic "1". Should a FET fail in the shorted condition, it will only reduce the floating logic "0" level voltage (+36 vdc) to +30 vdc. Since the pcpu is ac coupled by the receive circuit (FIG. 4) to the communication lines, the pcpu automatically adjusts to the new, lower line voltage. Negative voltage transitions are detected as logic "1"s from the new (+30 vdc) line voltage.

The effect of a failure of one peripheral on the communication net is best shown in FIG. 11. It is assumed that the peripheral fails, by its FET 14 becoming shorted, at time T0. At that time, the +36 vdc communication line is pulled down to +30 vdc. Although this signifies a false logic "1", the next sync pulse establishes the +30 vdc level as the new "0" logic level for all further transmissions over the communication net.

Fault tolerance is also accomplished by placing resistor R3 between the +36 vdc line and ac coupling capacitor C1. Thus, if capacitor C1 were to become shorted at time T1 (FIG. 11), resistor R3 would serve to limit the current drawn from the net lines. The +36 vdc line would therefore drop by for example 2 vdc, and the net lines would remain open for communication.

The present invention may be embodied in other specific forms without departigg from the spirit or essential attributes thereof and, accordingly, reference should be made to the appended claims, rather than to the foregoing specification, as indicating the scope of the invention.

We claim:
1. Communication net comprising
a pair of communication lines,
at least one peripheral device connected to said communication lines including means for receiving a general poll digital message transmitted on said communication lines which message includes a first format code identifying the message as a general poll and an address uniquely identifying the peripheral, means for validating said format code and address, means for monitoring the outputs of one or more devices connected to the peripheral, means for detecting a change in any of said outputs, and means for transmitting a digital message on said communication lines if a change has been detected in said outputs, said last-mentioned message including a second format code, an address identical to said address received by the peripheral, and a data field which indicates the status of said monitored outputs, and wherein said second format code indicates the length of said data field.

2. Communication net according to claim 1 wherein said digital message received by said peripheral includes a sync signal which varies between first and second line levels and wherein said format codes and addresses vary between said first line level and a third line level.

3. Communication net, comprising:
a pair of communication lines,
at least one peripheral device connected to said communication lines including means for receiving a general poll digital message transmitted on said communication lines which message includes a first format code identifying the message as a general poll and an address uniquely identifying said peripheral, means for validating said format code and said address, means for monitoring the outputs of one or more devices connected to the peripheral, means for detecting a change in any of said outputs, means for transmitting a digital message on said communication lines which includes a second format code and an address identical to said address received by said peripheral, wherein said second format code indicates that no change in said outputs has been detected.

4. Communication net according to claim 3 wherein said first and second format codes are identical.

5. Communication net according to claim 3 wherein said digital message received by said peripheral includes a sync signal which varies between first and second line levels and wherein said format codes and addresses vary between said first line level and a third line level.

6. Communication net according to claim 3 wherein said means for transmitting said digital message includes means for transmitting a data field as part of said message if a change in any of said outputs has been detected, said data field indicating the state of said outputs, and wherein said second format code indicates the length of said data field.

7. Communication net comprising:
a pair of communication lines,
at least one group of two or more peripherals connected to said communication lines,
each of said peripherals including means for receiving a digital message transmitted on said communication lines which message includes a format code identifying the message as a group poll and an address which uniquely identifies said group of peripherals, means for storing a priority message assigning a priority to said peripheral, means for validating said format code and said address, means for monitoring the outputs of one or more devices connected o the peripheral, means for detecting whether any of said outputs have chnnged, and means for transmitting a digital message on said communication lines after a wait period determined by said priority message and only if a change in at least one of said outputs has been detected, which digital message includes a second format code, an address including a portion identical to said address received by said peripheral, and a data field which indicates the status of said outputs, and wherein said second format code indicates the length of said data field.

8. Communication net according to claim 7 wherein said received digital message includes a sync signal which varies between first and second line levels, and wherein said format codes and addresses vary between said first line level and a third line level.

9. Communication net according to claim 7 wherein said peripheral further includes means for detecting at least the start of a digital message transmitted by another peripheral on said communication lines during said wait period, and means for preventing transmission of said digital message by said peripheral after the wait period if a digital message has been detected by said detecting means during the wait period.

10. Communication net according to claim 7 wherein said priority message is part of said address transmitted by said peripheral.

11. Communication net according to claim 7 including means for detecting whether any of said outputs have changed, and means for preventing transmission of said digital message by said peripheral after the wait period if no change in said outputs has been detected.

12. Communication net according to claim 11 including polling means for transmitting said group poll digital message which is received by said group of peripherals, said polling means including means for transmitting a second group poll digital message over said communication lines which includes an address identifying another, different group of peripherals if no digital message is transmitted by said first group of peripherals after a predetermined period of time.

13. Communication net comprising:
a pair of communication lines,
at least one group of two or more peripherals connected to said cmmmunication lines,
each of said peripherals including means for receiving a first digital message transmitted on said communication lines which message includes a first format code identifying the message as a data poll, an address uniquely identifying said peripheral, and a data field comprising at least one broadcast enable data bit, means for validating said first format code and said address, means for detecting said broadcast enable bit, means for receiving a second digtal message transmitted on said communication lines which includes a second format code identifying the second message as a broadcast on or off message, means for validating said second format code, and means for turning one or more devices on or off together in response to a detection of said broadcast enable bit followed by a reception of said second digital message.

14. Communication net according to claim 13 wherein said first digital message includes a sync signal which varies between a first line level and a second line level, and wherein said format codes, address and broadcast enable bit vary between said first line level and a third line level.

15. Communication net comprising:
a pair of communication lines,
at least one peripheral connected to said communication lines,
said peripheral including means for receiving a digital message which includes a first format code identifying the message as a data equire poll and an address uniquely identifying said peripheral, means for validating said format code and address, means for storing a family/device code indicating the family and type of peripheral, means for transmitting a digital message on said communication lines which includes a second format code, an address identical to said address received by said peripheral, and a data field comprising said stored family/device code.

16. Communication net according to claim 15 wherein the format code of said digital message transmitted by said peripheral indicates the length of said data field.

17. Communication net according to claim 15 wherein said digital message received by said peripheral includes a sync signal which varies between a first line level and a second line level, and wherein the format codes and addresses vary between said first line level and a third line level.

18. Communication net comprising:
a pair of communication lines,
at least one peripheral connected to said communication lines,
said peripheral including means for receiving a data poll digital message transmitted on said communication lines which includes a format code identifying the message as a data poll, an address uniquely identifying said peripheral, and a data field containing control information, said format code indicating the length of said data field, means for validating said format code and said address, and means for controlling one or more devices connected to the peripheral based on said data field control information.

19. Communication net according to claim 18 wherein said peripheral further comprises means for monitoring the outputs of one or more devices, means for detecting a change in any of said outputs, and means for transmitting a digital message on said communication lines which includes a second format code and an address code identical to said address received by said peripheral, and wherein said second format code indicates that no change in the status of said outputs has been detected.

20. Communication net according to claim 19 wherein said means for transmitting said digital message includes means for transmitting a data field as part of said message if a change in the status of said outputs has been detected, said data field indicating the status of said outputs, and wherein said second format code indicates the length of said data field.

21. Communication net according to claims 1, 6, 7, or 20 wherein each peripheral further includes means for latching the outputs of said monitored devices during transmission by said peripheral of said digital message containing said data field.

22. Communication net according to claims 1, 3, 7, 13, 15 or 18 wherein said means for validating said format code comprises means for storing one or more valid format codes, and means for comparing said format code received by said peripheral with said stored format codes.

23. Communication net according to claims 1, 3, 7, 13, 15 or 18 herein said means for validating said address comprises means for storing an address uniquely identifying said peripheral, and means for comparing said stored address with the address received by said peripheral.

24. Communication net according to claims 1, 6, 7 or 20 wherein said peripheral further comprises means for storing a threshold signal, and means for comparing the threshold signal with at least one of said outputs, and wherein said means for transmitting said digital message includes means for transmitting as part of said data field in said message at least one data bit which indicates that said output has reached said threshold.

25. Communication net accodding to claims 1, 3, or 7 wherein at least one of said monitored devices is a fire alarm pull station.

26. Communication net according to claims 1, 3, or 7 wherein at least one of said monitored devices is a smoke detector.

27. Communication net according to claim 18 wherein at least one of said output devices is a set of door contacts.

* * * * *